(12) United States Patent
Robinson et al.

(10) Patent No.: US 10,562,239 B2
(45) Date of Patent: Feb. 18, 2020

(54) METHOD FOR FORMING A FABRIC PREFORM INSERT FOR A COMPOSITE TANK Y-JOINT

(71) Applicant: The Boeing Company, Chicago, IL (US)

(72) Inventors: Michael J. Robinson, Huntington Beach, CA (US); Michael Leslie Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 14/594,131

(22) Filed: Jan. 11, 2015

(65) Prior Publication Data

US 2015/0298398 A1 Oct. 22, 2015

Related U.S. Application Data

(62) Division of application No. 12/841,502, filed on Jul. 22, 2010, now Pat. No. 8,974,135.

(51) Int. Cl.
*B29C 65/56* (2006.01)
*B29C 70/02* (2006.01)
(Continued)

(52) U.S. Cl.
CPC ............ *B29C 70/02* (2013.01); *B29C 65/562* (2013.01); *B64G 1/402* (2013.01); *B29B 11/16* (2013.01); *B29C 35/02* (2013.01); *B29C 65/48* (2013.01); *B29C 66/1162* (2013.01); *B29C 66/4344* (2013.01); *B29C 66/721* (2013.01); *B29L 2031/3097* (2013.01); *Y10T 403/47* (2015.01); *Y10T 428/19* (2015.01)

(58) Field of Classification Search
CPC ......... Y10T 428/2462; Y10T 428/2421; Y10T 428/24529; B29C 65/562; B29C 65/564
See application file for complete search history.

(56) References Cited

U.S. PATENT DOCUMENTS 2,755,216 A 7/1956 Lemons
3,124,032 A 3/1964 Webster et al.
(Continued)

FOREIGN PATENT DOCUMENTS

CA 2203863 A1 10/1998
CN 102352089 A 2/2012
(Continued)

OTHER PUBLICATIONS

State Intellectual Property Office of China Third Notification of Office Action and English translation, dated Dec. 9, 2016, 8 pages.
(Continued)

*Primary Examiner* — Scott W Dodds
(74) *Attorney, Agent, or Firm* — Yee & Associates, P.C.

(57) ABSTRACT

A method and apparatus for forming a joint. A composite insert may be placed into a joint region for a first structure. The composite insert may comprise a structure having a first portion, a second portion, and a third portion all extending from a junction; and a resin impregnated into the structure to form the composite insert. The second structure may be laid up. The composite insert may be bonded to the first structure and the second structure.

20 Claims, 7 Drawing Sheets

(51) Int. Cl.
  *B64G 1/40* (2006.01)
  *B29B 11/16* (2006.01)
  *B29C 35/02* (2006.01)
  *B29C 65/48* (2006.01)
  *B29C 65/00* (2006.01)
  *B29L 31/30* (2006.01)

(56) References Cited

U.S. PATENT DOCUMENTS

| | | |
|---|---|---|
| 3,124,034 A | 3/1964 | Esaosise |
| 3,243,150 A | 3/1966 | Woodcock |
| 3,400,849 A | 9/1968 | Pottier et al. |
| 3,814,275 A | 6/1974 | Lemons |
| 4,086,378 A | 4/1978 | Kam et al. |
| 4,331,723 A | 5/1982 | Hamm |
| 4,395,450 A | 7/1983 | Whitener |
| 4,452,162 A | 6/1984 | Harbaugh |
| 4,922,798 A | 5/1990 | Ivsan et al. |
| 4,946,056 A | 8/1990 | Stannard |
| 5,018,634 A | 5/1991 | Le Touche |
| 5,026,595 A | 6/1991 | Crawford et al. |
| 5,338,383 A | 8/1994 | Polackwoyj |
| 5,346,774 A | 9/1994 | Burgess |
| 5,611,453 A | 3/1997 | Schwartz et al. |
| 5,628,363 A | 5/1997 | Dewar et al. |
| 5,651,474 A | 7/1997 | Callaghan et al. |
| 5,655,600 A | 8/1997 | Dewar et al. |
| 5,735,412 A | 4/1998 | Shceckells |
| 5,788,907 A | 8/1998 | Brown, Jr. et al. |
| 5,845,399 A | 12/1998 | Dewar et al. |
| 5,951,812 A | 9/1999 | Gilchrist, Jr. |
| 6,019,243 A | 2/2000 | Marino |
| 6,267,175 B1 | 7/2001 | Anderson |
| 6,374,570 B1 | 4/2002 | McKague, Jr. |
| 6,422,514 B1 | 7/2002 | Clark et al. |
| 6,562,436 B2 | 5/2003 | George et al. |
| 6,689,448 B2 | 2/2004 | George et al. |
| 6,709,538 B2 | 3/2004 | George et al. |
| 6,712,099 B2 | 3/2004 | Schmidt et al. |
| 6,757,954 B2 | 7/2004 | Sei |
| 6,835,261 B2 | 12/2004 | Schmidt |
| 6,846,758 B2 | 1/2005 | Bhatnagar et al. |
| 6,863,767 B2 | 3/2005 | Bersuch et al. |
| 6,874,543 B2 | 4/2005 | Schmidt et al. |
| 6,945,727 B2 | 9/2005 | Christman et al. |
| 7,669,729 B2 | 3/2010 | Matsuoka et al. |
| 7,790,294 B2 | 9/2010 | MacGuire et al. |
| 7,904,147 B2 | 3/2011 | Schneider et al. |
| 8,042,767 B2 | 10/2011 | Velicki et al. |
| 8,656,571 B2 | 2/2014 | Hand |
| 8,917,809 B2 | 12/2014 | Nozawa |
| 8,939,407 B2 | 1/2015 | Robinson et al. |
| 2001/0047862 A1 | 12/2001 | Anderson et al. |
| 2003/0000641 A1 | 1/2003 | Schmidt |
| 2004/0084304 A1 | 5/2004 | Thompson |
| 2005/0092917 A1 | 5/2005 | Hirabayashi et al. |
| 2006/0065111 A1 | 3/2006 | Henry |
| 2007/0239212 A1 | 10/2007 | Schneider et al. |
| 2008/0124184 A1 | 5/2008 | Scheckells |
| 2008/0256960 A1 | 10/2008 | Greason et al. |
| 2009/0042474 A1 | 2/2009 | Lin et al. |
| 2009/0283638 A1* | 11/2009 | Arevalo Rodriguez ............. B29D 99/0014 244/119 |
| 2009/0311166 A1 | 12/2009 | Hart et al. |
| 2010/0012787 A1 | 1/2010 | Hand |
| 2010/0080942 A1 | 4/2010 | McCarville et al. |
| 2010/0116420 A1 | 5/2010 | Matsuoka et al. |
| 2011/0049750 A1 | 3/2011 | Bechtold |
| 2012/0018587 A1 | 1/2012 | Robinson et al. |
| 2012/0205493 A1 | 8/2012 | Robinson et al. |
| 2013/0136527 A1 | 5/2013 | Robinson et al. |
| 2013/0193151 A1 | 8/2013 | Robinson et al. |
| 2014/0077037 A1 | 3/2014 | Hand |

FOREIGN PATENT DOCUMENTS

| | | |
|---|---|---|
| CN | 102433636 A | 5/2012 |
| EP | 1149687 A2 | 10/2001 |
| EP | 2006074 A1 | 12/2008 |
| EP | 2354622 A1 | 8/2011 |
| EP | 2439059 A2 | 4/2012 |
| JP | S4912162 A | 2/1974 |
| JP | S6151314 A | 3/1986 |
| JP | H01253315 A | 3/1988 |
| JP | H04272841 A | 9/1992 |
| JP | H0530191 A | 2/1993 |
| JP | 2004245348 A | 9/2004 |
| WO | WO9730321 A1 | 8/1997 |
| WO | WO0216784 A2 | 2/2002 |

OTHER PUBLICATIONS

Combined Search and Examination Report, dated Nov. 4, 2011, regarding Application No. GB1111333.9, 7 pages.
Search and Examination Report, dated Jan. 7, 2013, regarding Application No. GB1111333.9, 3 pages.
International Search Report and Written Opinion, dated May 4, 2012, regarding Application No. PCT/US2011/065549, 12 pages.
International Search Report and Written Opinion, dated Nov. 19, 2013, regarding Application No. PCT/US2013/043455, 9 pages.
International Search Report and Written Opinion, dated May 21, 2014, regarding Application No. PCT/US2013/043471, 11 pages.
International Preliminary Report on Patentability, dated Jan. 15, 2015, regarding Application No. PCT/US2013/043455, 7 pages.
International Preliminary Report on Patentability, dated Jan. 15, 2015, regarding Application No. PCT/US2013/043471, 7 pages.
"2D Softened Y-Joint Simulation", DC-XA Task 2 Test Report 7.0.Doc, retrieved Jun. 27, 2008, pp. 1-9.
"Softening Strip Material Characterization", DC-XA Task 2 Test Report 6.0.Doc, retrieved Jun. 27, 2008, pp. 1-9.
Blanco et al., "Limiting Mechanisms of Mode I Interlaminar Toughening of Composites Reinforced with Alligned Carbon Nanotubes," Journal of Composite Materials, vol. 43, No. 8, Apr. 2009, 18 pages.
Garcia et al., "Joining prepreg composite interfaces with aligned carbon nanotubes," Composites: Part A, Applied Science and Manufacturing, vol. 39, Issue 6, Jun. 2008, pp. 1065-1070.
"Thomson, ""'Nanostitching' could lead to much stronger airplane skins, more,"" MIT News, Mar. 5, 2009, 2 pages. Accessed Mar. 9, 2012, http://web.mit.edu/newsoffice/2009/nanostitching-0305.html".
Veedu et al., "Multifunctional composites using reinforced laminae with carbon-nanotube forests," Nature Materials, vol. 5, Jun. 2006, pp. 457-462.
Wardle et al., "Fabrication and Characterization of Ultrahigh-Volume-Fraction Aligned Carbon Polymer Composites," Advanced Materials, vol. 20, Issue 14, Jun. 2008, 8 pages.
Wicks et al., "Interlaminar and intralaminar reinforcement of composite laminates with aligned carbon nanotubes," Composite Science and Technology, vol. 70, Issue 1, Jan. 2010, 9 pages.
Office Action, dated Sep. 12, 2011, regarding U.S. Appl. No. 12/175,735, 12 pages.
Final Office Action, dated Jan. 20, 2012, regarding U.S. Appl. No. 12/175,735, 9 pages.
Notice of Allowance, dated Oct. 9, 2013, regarding U.S. Appl. No. 12/175,735, 33 pages.
Office Action, dated Jul. 3, 2013, regarding U.S. Appl. No. 12/841,502, 42 pages.
Final Office Action, dated Jan. 16, 2014, regarding U.S. Appl. No. 12/841,502, 16 pages.
Office Action, dated Jul. 10, 2014, regarding U.S. Appl. No. 12/841,502, 23 pages.
Notice of Allowance, dated Oct. 10, 2014, regarding U.S. Appl. No. 12/841,502, 19 pages.
Office Action, dated Aug. 16, 2013, regarding U.S. Appl. No. 13/027,429, 37 pages.
Final Office Action, dated Feb. 5, 2014, regarding U.S. Appl. No. 13/027,429, 18 pages.

(56) References Cited

OTHER PUBLICATIONS

Office Action, dated Jul. 8, 2014, regarding U.S. Appl. No. 13/027,429, 17 pages.
Notice of Allowance, dated Oct. 7, 2014, regarding U.S. Appl. No. 13/027,429, 17 pages.
Office Action, dated Oct. 15, 2012, regarding U.S. Appl. No. 12/841,413, 18 pages.
Final Office Action, dated Mar. 6, 2013, regarding U.S. Appl. No. 12/841,413, 11 pages.
Robinson et al., "Fabric Preform Insert for a Composite Tank Y-Joint," U.S. Appl. No. 12/838,586, filed Jul. 19, 2010, 42 pages.
Koch IV, "Toughened Composite Filler and Method of Making the Same," U.S. Appl. No. 12/841,413, filed Jul. 22, 2010, 44 pages.
State Intellectual Property Office of China First Notification of Office Action and English translation, dated Oct. 28, 2015, 12 pages.
European Patent Office Communication, dated Nov. 20, 2015, regarding Application No. EP13730398.8, 4 pages.
State Intellectual Property Office of China Second Notification of Office Action and English translation, dated Jun. 28, 2016, 7 pages.
Office Action, dated Oct. 7, 2016, regarding U.S. Appl. No. 13/541,534, 25 pages.
"Teflon™ PTFE DISP 30 Fluoroplastic Dispersion", The Chemours Company FC, LLC., C-10146, Nov. 2015, 2 pages. https://www.chemours.com/Teflon_industrial/en_US/assets/downloads/Chemours_teflon_PTFE_DISP_30_Product_Info_K25654.pdf.
Office Action, dated Dec. 14, 2016, regarding U.S. Appl. No. 14/088,438, 39 pages.
Notice of Allowance, dated Feb. 5, 2016, regarding U.S. Appl. No. 13/541,560, 62 pages.
State Intellectual Property Office of China First Notification of Office Action English Translation, regarding Application No. 201380035040.3, dated Feb. 3, 2016, 5 pages.
Final Office Action, dated Mar. 21, 2017, regarding U.S. Appl. No. 14/088,438, 20 pages.
Final Office Action, dated Apr. 19, 2017, regarding U.S. Appl. No. 13/541,534, 34 pages.
Japanese Patent Office Notice of Reasons for Rejection, dated Feb. 27, 2017, regarding Application No. 2015-520210, 8 pages.
European Patent Office Examination Report, dated Sep. 22, 2017, regarding Application No. 13730398.8, 7 pages.
Office Action, dated Sep. 22, 2017, regarding U.S. Appl. No. 13/541,534, 41 pages.
Notice of Allowance, dated Nov. 1, 2017, regarding U.S. Appl. No. 14/088,438, 18 pages.
Office Action, dated Apr. 19, 2018, regarding U.S. Appl. No. 13/541,534, 36 pages.
Notice of Allowance, dated Feb. 23, 2018 regarding U.S. Appl. No. 14/088,438, 7 pages.
Final Office Action, dated Nov. 27, 2018, regarding U.S. Appl. No. 13/541,534, 27 pages.
Notice of Allowance, dated Jan. 9, 2019, regarding U.S. Appl. No. 15/175,041, 9 pages.
State Intellectual Property Office of China Second Notification of Office Action and English Translation, dated Aug. 18, 2016, regarding Application No. 201380035040.3, 10 pages.
Office Action, dated Sep. 20, 2018, regarding U.S. Appl. No. 15/175,041, 58 pages.
Japanese Patent Office Notice of Reasons for Rejection, dated Jun. 12, 2017, regarding Application No. 2015-520209, 9 pages.
Japanese Patent Office Notice of Reasons for Rejection, dated Jul. 24, 2017, regarding Application No. 2015-520210, 10 pages.

* cited by examiner

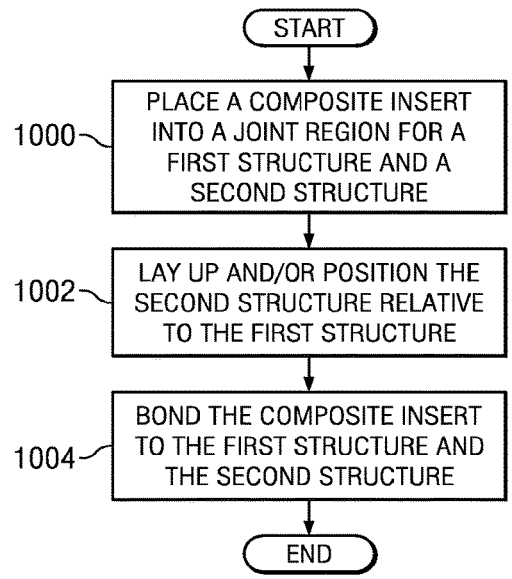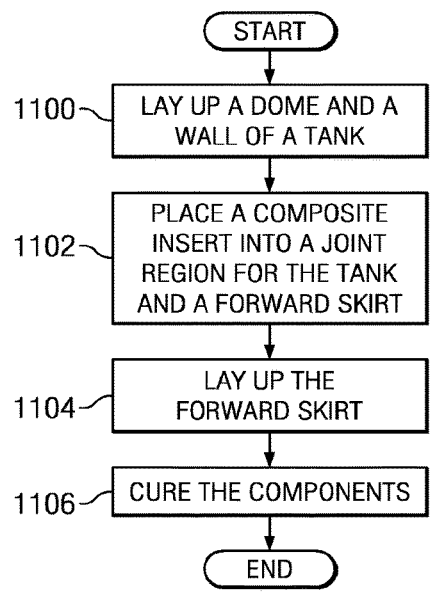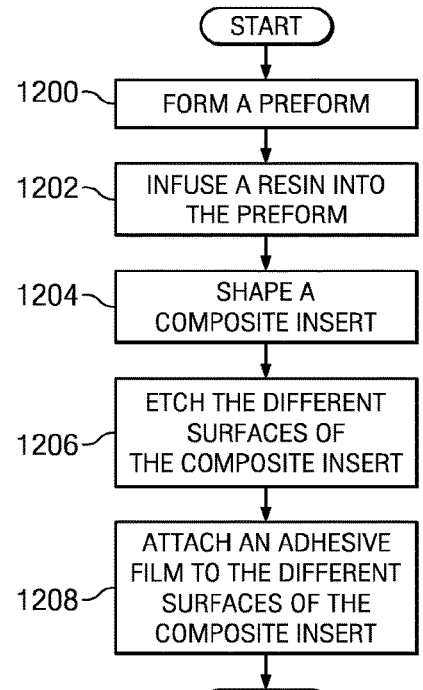

METHOD FOR FORMING A FABRIC PREFORM INSERT FOR A COMPOSITE TANK Y-JOINT

This application is a divisional application of U.S. Pat. No. 8,974,135, filed Jul. 22, 2010 and issued Mar. 10, 2015.

BACKGROUND INFORMATION

1. Field

The present disclosure relates generally to manufacturing vehicles and, in particular, to manufacturing spacecraft. Still more particularly, the present disclosure relates to a method and apparatus for attaching a composite tank to a structure of a spacecraft.

2. Background

Both a space shuttle and a launch vehicle may be examples of spacecraft with propulsion systems. These propulsion systems may include various types of propellants, such as, for example, without limitation, a solid propellant, a liquid propellant, a mixture of both solid and liquid propellants, and/or other suitable types of propellants or liquids. Liquid propellants may include, for example, without limitation, liquid hydrogen and/or liquid oxygen. These propellants may be stored in liquid form in cryogenic tanks. A cryogenic tank may store and/or maintain liquid propellants at very low temperatures, such as, for example, without limitation, about −297 degrees Fahrenheit in the case of liquid oxygen and about −423 degrees Fahrenheit in the case of liquid hydrogen.

In a spacecraft vehicle that uses these types of propellants, the cryogenic tank may be connected to the structure of the spacecraft using joints. A joint may be a location and/or place where a first structure may be attached to a second structure. Y-joints may be used to connect the tanks to the structures of the spacecraft. A Y-joint may be a joint in which a cross section of the joint may have a "Y" shape. In order to minimize weight, the tanks may be made of composite materials.

Y-joints have been developed for cryogenic tanks made of composite materials. However, these Y-joints may have a less than desired ability to carry loads between cryogenic tanks and the spacecraft.

Therefore, it would be advantageous to have a method and apparatus that takes into account at least some of the issues discussed above, as well as other possible issues.

SUMMARY

In one advantageous embodiment, an apparatus may comprise a structure. The structure may comprise fibers in which the structure may have a first portion, a second portion, and a third portion all extending from a junction. A resin may be impregnated into the structure to form a composite insert.

In another advantageous embodiment, a launch vehicle may comprise a composite insert, a first structure, and a second structure. The composite insert may comprise a structure comprising fibers and a resin impregnated into the structure to form the composite insert. The structure may have a first portion, a second portion, and a third portion all extending from a junction. The first portion may have a first surface and a second surface. The second portion may have a first surface and a second surface. The third portion may have a first surface and a second surface. The fibers may form a fabric comprising at least one of woven fibers, non-woven fibers, braided fibers, and stitched fibers and may include at least one of graphite fibers, glass fibers, and para-aramid fibers. The resin may comprise at least one of an epoxy, a bismaleimide, and a polyimide. A surface of the first structure may be bonded to the first surface of the first portion and the first surface of the second portion of the composite insert. A surface of the second structure may be bonded to the second surface of the third portion and to the second surface of the first portion of the composite insert. The first structure may be a structure for one of a launch vehicle, a spacecraft, and an aircraft. The composite insert may be associated with the first structure and the second structure to form a Y-joint between the first structure and the second structure. The second structure may be a tank configured to hold a liquid propellant. The first structure and the second structure may be comprised of a material selected from at least one of a composite material, a metal, and a metal alloy.

In yet another advantageous embodiment, a method may be provided for forming a joint. A first portion, a second portion, and a third portion is joined to form a composite insert. A composite insert may be placed into a joint region for a first structure. The composite insert may be resin impregnated into the structure. The second structure may be laid up. The composite insert may be bonded to the first structure and the second structure.

In still yet another advantageous embodiment, a method may be provided for forming a Y-joint. A structure having a first portion, a second portion, and a third portion all extending from a junction may be formed. The first portion may have a first surface and a second surface. The second portion may have a first surface and a second surface. The third portion may have a first surface and a second surface. A resin may be infused into the structure to form a composite insert. The composite insert may be placed into a joint region for a first structure and a second structure. The second structure may be laid up relative to the first structure. A surface of the first structure may be bonded to the first surface of the first portion and the first surface of the second portion of the composite insert. A surface of the second structure may be bonded to the second surface of the first portion and the second surface of the third portion of the composite insert to form the Y-joint between the first structure and the second structure. The first structure and the second structure may be cured with the composite insert in place.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 10 is an illustration of a flowchart of a process for forming a Y-joint in accordance with an advantageous embodiment;

FIG. 11 is an illustration of a flowchart of a process for creating a Y-joint for a tank in accordance with an advantageous embodiment; and FIG. 12 is an illustration of a flowchart of a process for creating a composite insert in accordance with an advantageous embodiment.

DETAILED DESCRIPTION

Figure 1:
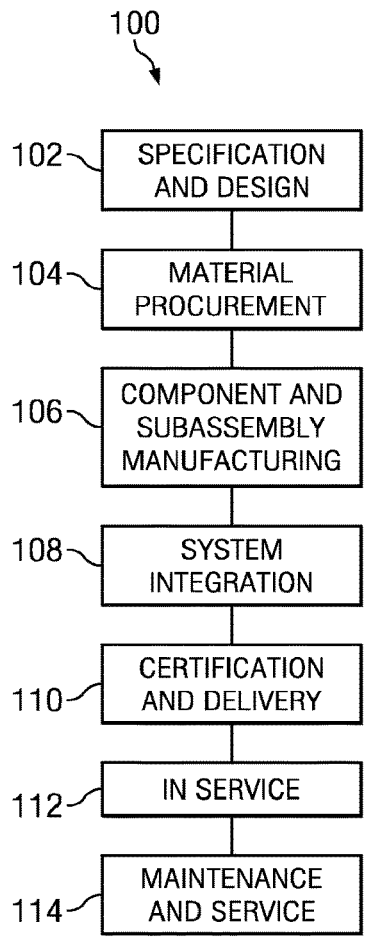
FIG. 1 is an illustration of a spacecraft manufacturing and service method in accordance with an advantageous embodiment.
Figure 2:
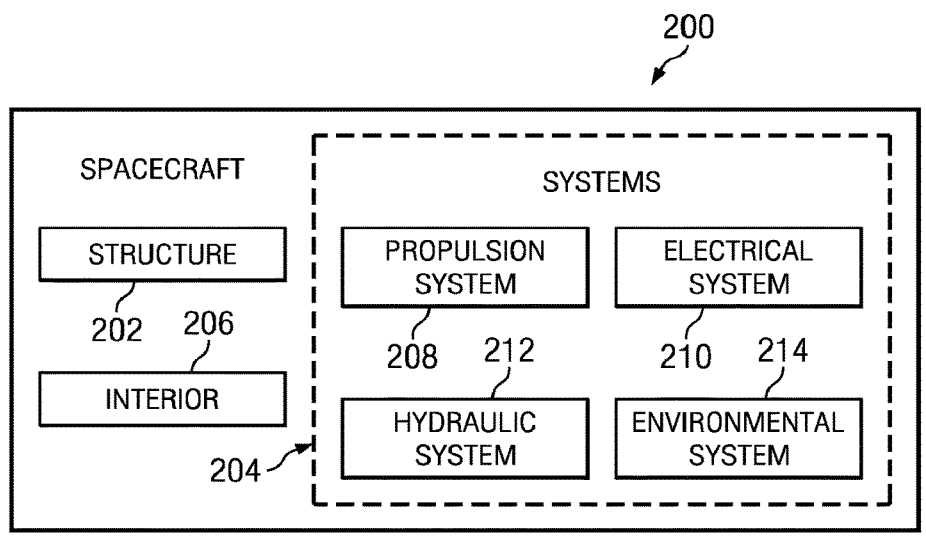
FIG. 2 is an illustration of a spacecraft in which advantageous embodiments may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment.

During pre-production, exemplary spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 may take place. Thereafter, spacecraft 200 in FIG. 2 may go through certification and delivery 110 in order to be placed in service 112. While in service 112 by a customer, spacecraft 200 in FIG. 2 may be scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major system subcontractors; a third party may include, for example, without limitation, any number of vendors, subcontractors, and suppliers; and an operator may be a country, leasing company, military entity, service organization, and so on.

With reference now to FIG. 2, an illustration of a spacecraft is depicted in which advantageous embodiments may be implemented. In this example, spacecraft 200 may be produced by spacecraft manufacturing and service method 100 in FIG. 1. Spacecraft 200 may include structure 202 with a plurality of systems 204 and interior 206.

Examples of systems 204 may include, for example, without limitation, one or more of propulsion system 208, electrical system 210, hydraulic system 212, and environmental system 214. Any number of systems may be included. Further, in some implementations, some of the systems may not be needed. For example, when spacecraft 200 takes the form of a launch vehicle, environmental system 214 may be unnecessary.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1.

Also, one or more apparatus embodiments, method embodiments, or a combination thereof may be utilized during production stages, such as component and subassembly manufacturing 106 and system integration 108 in FIG. 1 as an example, without limitation. These embodiments may substantially expedite the assembly of, or reduce the cost of, spacecraft 200.

In these examples, advantageous embodiments may be implemented to attach components in propulsion system 208 to structure 202 in spacecraft 200. The different advantageous embodiments may be applied to attach any structure within spacecraft 200 to any other structure in other implementations.

The different advantageous embodiments recognize and take into account a number of different considerations. For example, without limitation, the different advantageous embodiments recognize and take into account that it may be desirable to increase the strength of currently available joints between the structure of a spacecraft and a tank containing a propellant above current levels with respect to various forces. Forces on the joint may include, for example, without limitation, shear forces, bending, and/or torsion at the joint between the structure of a spacecraft and a tank.

Current tanks may be metal tanks that typically use welded joints. In these examples, the joints may take the form of Y-joints. In other words, these joints may have cross-sections that have a "Y" shape. Composite tanks may be employed to provide weight savings over metal tanks. With these types of composite tanks, however, the currently available Y-joints used for these composite tanks may have less than desired strength. Y-joints with sufficient strength may not be possible with currently available Y-joint designs and techniques.

The different advantageous embodiments recognize and take into account that the strength of a Y-joint may be increased using a softening strip. A softening strip may be a component used to reinforce a joint. The softening strip may have a three-dimensional preform impregnated with, for example, without limitation, a plastic matrix to form the softening strip. For example, without limitation, in some cases, a softening strip may be used with or made as part of a Y-joint. Joints made with the softening strip, however, still may not be able to carry loads imposed for some cryogenic tanks.

The different advantageous embodiments also recognize and take into account that a composite tank may be pressurized and configured to hold a liquid and/or gas. The pressure of the composite tank and operation of the spacecraft during flight may generate loads that may generate large stresses at a Y-joint used to hold the composite tank to the structure of the spacecraft. As a result, with composite tanks, the load applied to the joints may be reduced by reducing the size of the tanks.

The different advantageous embodiments recognize and take into account that using a composite material in the Y-joint may increase the strength of the joint. The different advantageous embodiments also recognize and take into account that fibers may be arranged in a desired configuration with a resin to provide increased strength for Y-joints.

Thus, in one advantageous embodiment, an apparatus may comprise a structure with fibers in which the structure may have a first portion, a second portion, and a third portion all extending from a junction. The second layer may extend from a surface of the first layer. A resin may be impregnated into the structure to form a composite insert.

Figure 3:
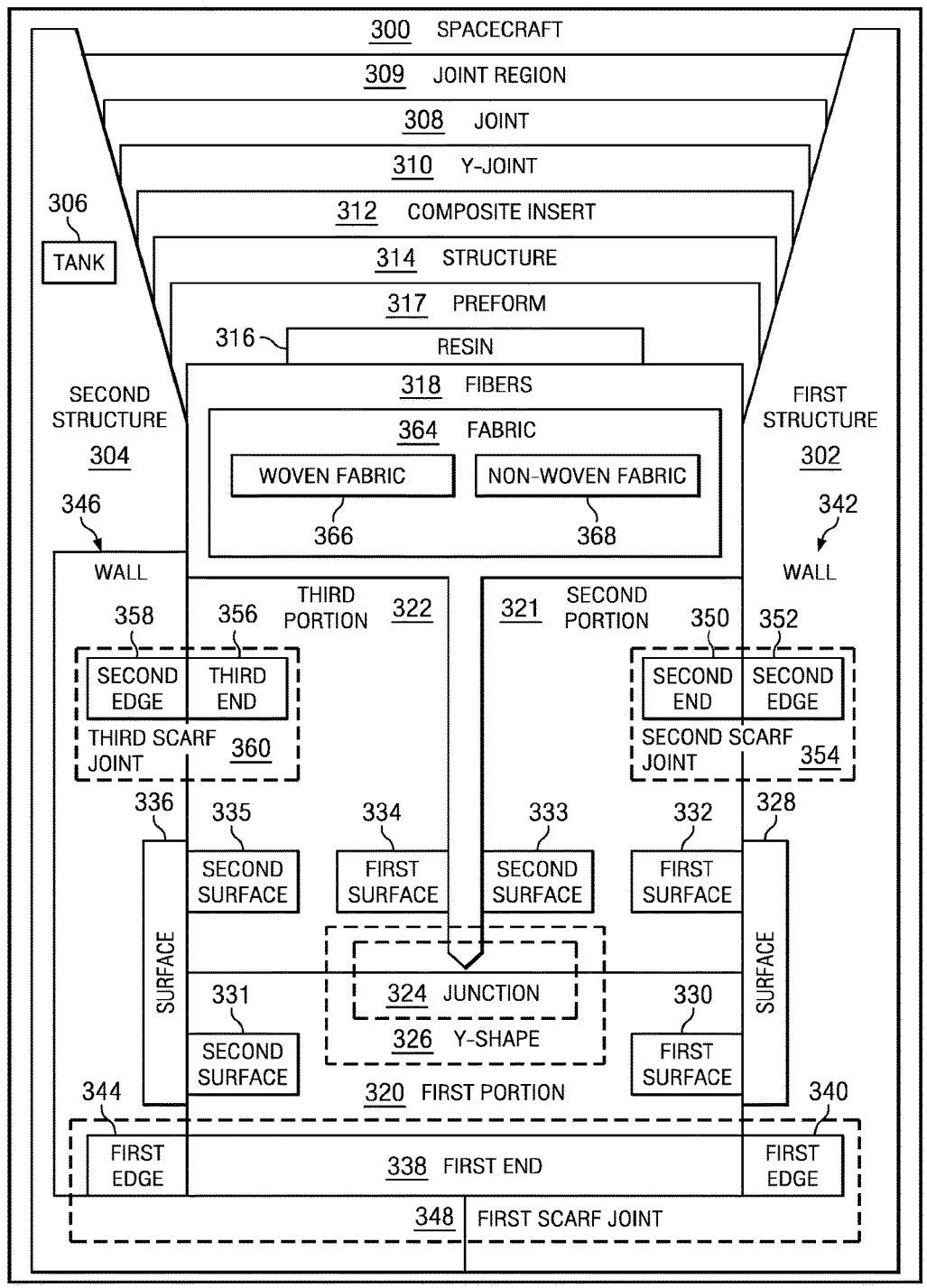
FIG. 3 is an illustration of a spacecraft in accordance with an advantageous embodiment.

With reference now to FIG. 3, an illustration of a spacecraft is depicted in accordance with an advantageous embodiment. Spacecraft 300 may be an example of spacecraft 200 in FIG. 2. In this illustrative example, spacecraft 300 may include first structure 302 and second structure 304.

First structure 302 may be the structure of spacecraft 300 providing a frame or other support for other components in spacecraft 300. First structure 302 may also be referred to as a skirt. Second structure 304 may be, for example, without limitation, tank 306. Of course, second structure 304 may be any other component that may be located within spacecraft 300 that is to be attached to first structure 302.

In these illustrative examples, first structure 302 may be associated with second structure 304 using joint 308. Joint 308 may be formed in joint region 309 between first structure 302 and second structure 304. In these illustrative examples, joint 308 may take the form of Y-joint 310. Y-joint 310 may have a cross-section that has a "Y" shape. Of course, joint 308 may take the form of any type of structural joint in addition to or in place of Y-joint 310.

A first component may be considered to be associated with a second component by being secured to the second component, bonded to the second component, fastened to the second component, fastened and bonded to the second component, associated with the second component by a combination of the above, and/or connected to the second component in some other suitable manner. The first component also may be connected to the second component by using a third component. The first component may also be considered to be associated with the second component by being formed as part of and/or an extension of the second component.

In these illustrative examples, composite insert 312 may be used to form joint 308. In particular, when composite insert 312 is configured for use in forming Y-joint 310, composite insert 312 may be placed into joint region 309. Composite insert 312 may comprise structure 314 and resin 316. Resin 316 may be impregnated into structure 314 to form composite insert 312. In this illustrative example, structure 314 may be referred to as preform 317 prior to resin 316 being impregnated into structure 314. Resin 316 may be cured in structure 314. Preform 317 may be a dry preform prior to resin 316 being impregnated into preform 317 in these examples.

Structure 314 may comprise fibers 318 and may have first portion 320, second portion 321, and third portion 322. First portion 320, second portion 321, and third portion 322 may form Y-shape 326. As depicted, first portion 320, second portion 321, and third portion 322 all may extend from junction 324.

In this illustrative example, first portion 320 may have first surface 330 and second surface 331 located opposite of first surface 330. Second portion 321 may have first surface 332 and second surface 333 located opposite of first surface 332. Third portion 322 may have first surface 334 and second surface 335 located opposite of first surface 334.

In one advantageous embodiment, surface 328 of first structure 302 may be bonded to first surface 330 of first portion 320 and first surface 332 of second portion 321 of composite insert 312. Surface 336 of second structure 304 may be bonded to second surface 331 of first portion 320 and second surface 335 of third portion 322. As depicted, at least a portion of surface 328 of first structure 302 may be located opposite of surface 336 of second structure 304.

In another advantageous embodiment, composite insert 312 may be associated with first structure 302 and second structure 304 such that composite insert 312 may form a part of these two structures. For example, without limitation, first end 338 of first portion 320 may be bonded to first edge 340 of wall 342 for first structure 302 and to first edge 344 of wall 346 for second structure 304. First end 338 bonded to first edge 340 and first edge 344 may form first scarf joint 348 for first portion 320.

In these illustrative examples, a scarf joint may have faces that include overlapping sections or surfaces to connect an end to a number of edges. For example, without limitation, first scarf joint 348 may have faces that may include overlapping sections or surfaces to connect first end 338 of composite insert 312 to first edge 340 of wall 342.

Further, second end 350 of second portion 321 may be bonded to second edge 352 of wall 342 in first structure 302. Second end 350 bonded to second edge 352 may form second scarf joint 354 for second portion 321. Third end 356 of third portion 322 may be bonded to second edge 358 of wall 346 for second structure 304. Third end 356 bonded to second edge 358 of wall 346 may form third scarf joint 360. In this manner, composite insert 312 may be formed as a part of first structure 302 and second structure 304 in forming Y-joint 310.

In the different advantageous embodiments, the bonding of the different ends of composite insert 312 with the different edges of wall 342 and wall 346 may be performed in a number of different ways. This bonding may be performed using, for example, without limitation, adhesives, welding, fasteners, curing processes, and/or other suitable processes.

In these illustrative examples, fibers 318 may be configured in a number of different ways to form Y-shape 326 having junction 324. For example, without limitation, fibers 318 may be configured as fabric 364. Fabric 364 may be any configuration of fibers 318 that may form a flexible material. This flexibility may be present prior to curing of resin 316 impregnated in preform 317 to form composite insert 312. In particular, fabric 364 may be a network formed by fibers 318. Further, fibers 318 may be configured to have more than one direction in fabric 364.

Fabric 364 may take a number of different forms. For example, fabric 364 may be at least one of woven fabric 366, non-woven fabric 368, and other suitable forms of fabric. Woven fabric 366 may be formed by weaving fibers 318. In other words, threads made from fibers 318 may be interlaced with each other to form woven fabric 366. These threads may be referred to as, for example, without limitation, tows. In this manner, fibers 318 may have at least two or more directions in fabric 364.

Non-woven fabric 368 may be formed by associating fibers 318 with each other. This association may be made in a number of different ways. For example, without limitation, non-woven fabric 368 may be formed by stitching fibers 318, braiding fibers 318, and/or using other mechanisms for associating fibers 318 with each other. Additionally, non-woven fabric 368 may comprise fibers 318 that may be joined to each other by entangling the fibers to each other.

In these illustrative examples, fibers 318 may be comprised of a number of different types of materials. For example, without limitation, fibers 318 may be comprised of at least one of graphite fibers, glass fibers, para-aramid fibers, and other suitable types of fibers. Additionally, resin 316 may take a number of different forms. For example, without limitation, resin 316 may be comprised of at least one of an epoxy, a bismaleimide, a polyimide, and other suitable types of resins.

In these illustrative examples, composite insert 312 may be cured prior to use in forming Y-joint 310. Composite insert 312 may be only partially cured in some illustrative examples. In other advantageous embodiments, additional curing of composite insert 312 may occur forming Y-joint 310.

The illustration of spacecraft 300 in FIG. 3 is not meant to imply physical or architectural limitations to a manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, first structure 302 and second structure 304 may be structures used in another vehicle other than spacecraft 300. For example, these structures may be used in an aircraft. In other advantageous embodiments, spacecraft 300 may take the form of, for example, without limitation, a shuttle, a launch vehicle, a combination of a space shuttle and a launch vehicle, and/or some other suitable vehicle capable of space travel.

Figure 4:
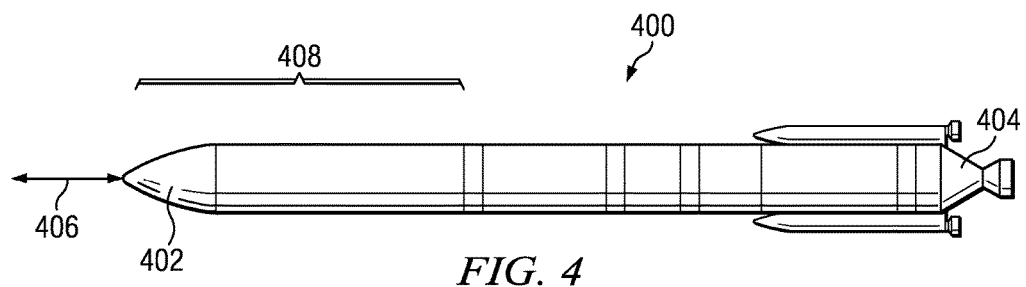
FIG. 4 is an illustration of a spacecraft in accordance with an advantageous embodiment.

With reference now to FIG. 4, an illustration of a spacecraft is depicted in accordance with an advantageous embodiment. In this example, launch vehicle 400 is an example of one implementation of spacecraft 300 in FIG. 3. Launch vehicle 400 has forward section 402 and aft section 404. Launch vehicle 400 may have longitudinal axis 406. Launch vehicle 400 is an example of a spacecraft in which Y-joint 310 in FIG. 3 may be implemented. Section 408 may be an example of a portion of launch vehicle 400 in which Y-joint 310 may be found and/or implemented.

Figure 5:
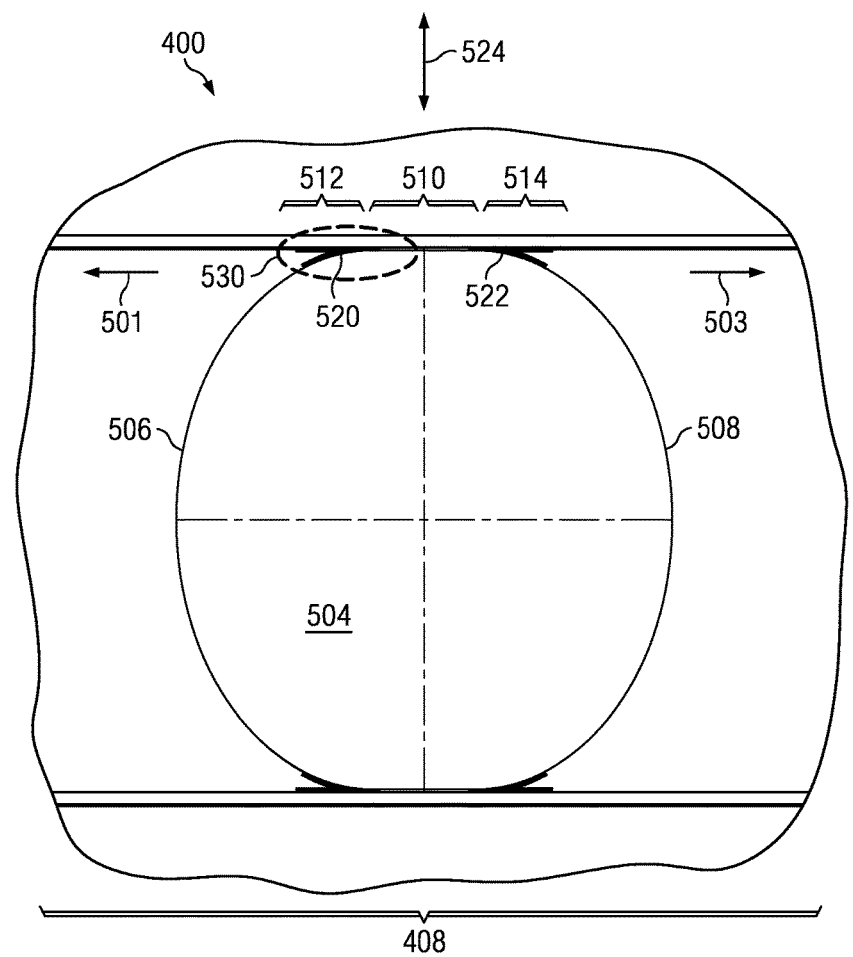
FIG. 5 is an illustration of a cut-away side view of a portion of a launch vehicle in accordance with an advantageous embodiment.

With reference now to FIG. 5, an illustration of a cut-away side view of a portion of a launch vehicle is depicted in accordance with an advantageous embodiment. In this diagram, a cut-away side view of section 408 of launch vehicle 400 is depicted. This view may allow the interior of launch vehicle 400 to be presented.

In this example, arrow 501 points towards the forward part of launch vehicle 400, while arrow 503 points to the aft portion of launch vehicle 400.

In this illustrative example, tank 504 in launch vehicle 400 may include dome 506, dome 508, and wall 510. Wall 510 may be a cylindrical wall in these examples. Wall 510 may be attached to forward skirt 512 and aft skirt 514. Wall 510 may be located between forward skirt 512 and aft skirt 514. In this example, wall 510 may be a pressurized portion of tank 504, while forward skirt 512 and aft skirt 514 may be located at unpressurized portions of tank 504.

Forward skirt 512 and aft skirt 514 are examples of structures to which tank 504 may be attached. In these examples, these different structures may be cylindrical in form, of which only a cross-section may be seen in FIG. 5. In this depicted example, Y-joint 520 and Y-joint 522 may be present. Y-joint 520 may be formed from the intersection of dome 506, wall 510, and forward skirt 512. Y-joint 522 may be formed at the intersection of dome 508, wall 510, and aft skirt 514. In these examples, Y-joint 520 and Y-joint 522 may be continuous in circumferential direction around axis 524.

In these examples, tank 504 may take the form of a composite cryogenic tank. Tank 504 may hold a propellant, such as, for example, without limitation, liquid hydrogen and/or liquid oxygen. In this example, tank 504 may hold liquid hydrogen. Further, tank 504 may be greater than about 16 feet in diameter. A more detailed illustration of Y-joint 520 in section 530 is shown in FIG. 6 below.

Figure 6:
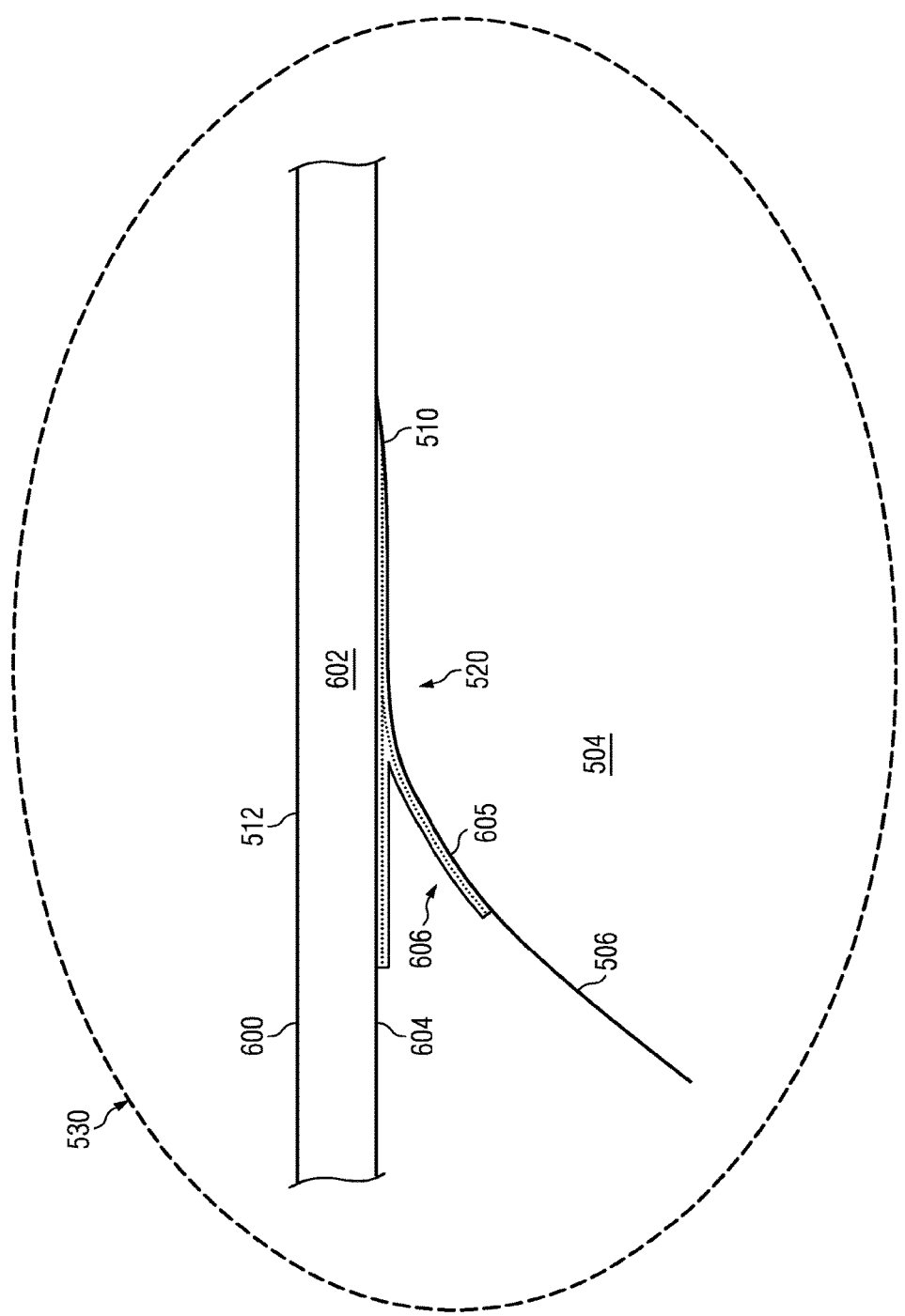
FIG. 6 is an illustration of a Y-joint in accordance with an advantageous embodiment.

Turning now to FIG. 6, an illustration of a Y-joint is depicted in accordance with an advantageous embodiment. As illustrated in section 530, forward skirt 512 may include outboard skin 600, core 602, and inboard skin 604. However, in other illustrative examples, forward skirt 512 may take the form of a solid laminate without a core.

In this illustrative example, outboard skin 600 and inboard skin 604 may be face sheets with core 602 being located between those face sheets. Core 602 may be a low-density structure element. Core 602 may be used, for example, without limitation, to transmit loads between outboard skin 600 and inboard skin 604. Core 602 may take various forms. For example, without limitation, core 602 may have a fluted, honeycombed, or other suitable type of form. In these examples, a fluted structure may be a desired structure for core 602.

In this illustrative example, Y-joint 520 may be formed at the intersection of dome 506, wall 510, and forward skirt 512. Dome 506 and wall 510 form surface 605 for tank 504. Y-joint 520 may be formed using composite insert 606. Composite insert 606 may be an example of one implementation for composite insert 312 in FIG. 3. Composite insert 606 may be bonded to inboard skin 604 and tank 504.

In the different advantageous embodiments, composite insert 606 may be co-bonded to inboard skin 604 and tank 504 along with the bonding of inboard skin 604 to tank 504. In other words, these different components may be co-bonded to each other at the same time. When forward skirt 512 takes the form of a solid laminate without a core, composite insert 606 may be bonded to the inboard side of the solid laminate.

The co-bonding, in these examples, may take the form of one or more curing processes in which the composite components in composite insert 606, inboard skin 604, and tank 504 may be cured to bond these components to each other. In other illustrative examples, composite insert 606, inboard skin 604, and tank 504 may be cured separately and then subsequently bonded together.

The illustration of tank 504 is presented for purposes of depicting one manner in which different advantageous embodiments may be implemented. Composite insert 606, in the different advantageous embodiments, may be applied to other tank and/or skirt geometries. For example, without limitation, although tank 504 is shown with a cylindrical wall, other tank configurations may be employed. As an example, a conical wall for wall 510 may be used. Also, other tanks may not be readily symmetric. Regardless of the structure or shape of tank 504, a Y-joint may be used.

Figure 7:
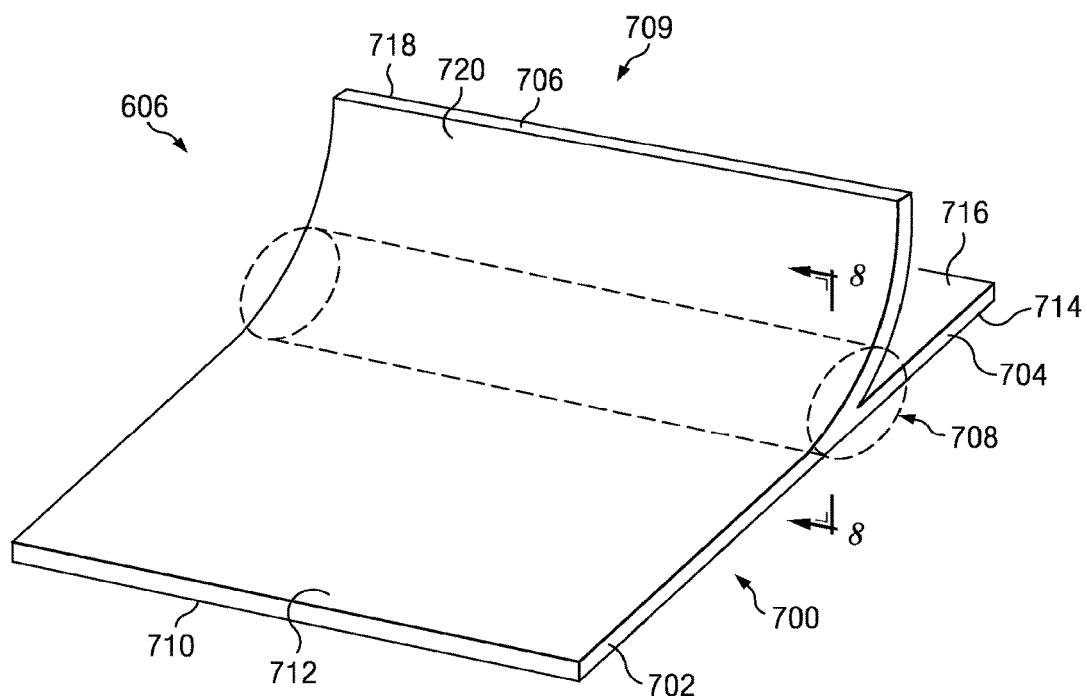
FIG. 7 is an illustration of a composite insert in accordance with an advantageous embodiment.

With reference now to FIG. 7, an illustration of a composite insert is depicted in accordance with an advantageous embodiment. In this illustrative example, a perspective view of a portion of composite insert 606 is depicted in accordance with an advantageous embodiment.

As illustrated, composite insert 606 may comprise structure 700. Structure 700 may have first portion 702, second portion 704, and third portion 706 all extending from junction 708. First portion 702, second portion 704, and third portion 706 may form cross-section 709 in these illustrative examples. Additionally, a resin (not shown), such as resin 316 in FIG. 3, may be impregnated into first portion 702, second portion 704, and third portion 706 in structure 700 to form composite insert 606. The resin may be cured in composite insert 606.

First portion 702 may have first surface 710 and second surface 712 located opposite of first surface 710. Second portion 704 may have first surface 714 and second surface 716 located opposite of first surface 714. Third portion 706 may have first surface 718 and second surface 720 located opposite of first surface 718.

First surface 710 of first portion 702 and first surface 714 of second portion 704 may be bonded to inboard skin 604 of forward skirt 512 in FIG. 6. Second surface 712 of first portion 702 and second surface 720 of third portion 706 may be bonded to surface 605 of tank 504 in FIG. 6.

In this illustrative example, structure 700 may extend in a cylindrical or circular form to wrap around tank 504 in FIGS. 5 and 6. In other advantageous embodiments, multiple structures, such as structure 700, may be used to form Y-joint 520 to hold tank 504 to wall 510 and forward skirt 512 in FIG. 5.

Figure 8:
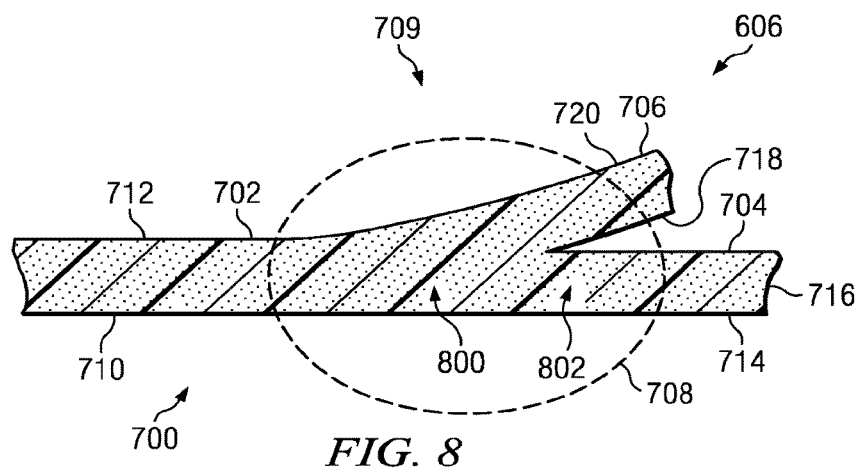
FIG. 8 is an illustration of a cross-sectional view of a composite insert in accordance with an advantageous embodiment.

Turning next to FIG. 8, an illustration of a cross-sectional view of a composite insert is depicted in accordance with an advantageous embodiment. In this illustrative example, composite insert 606 is illustrated in a cross-sectional view taken along lines 8-8 in FIG. 7. As depicted in this illustrative example, structure 700 of composite insert 606 may be comprised of fibers 800. Further, resin 802 may be impregnated in structure 700. Resin 802 may be cured in structure 700. In other words, composite insert 606 may be pre-cured before being used to form a joint.

Figure 9:
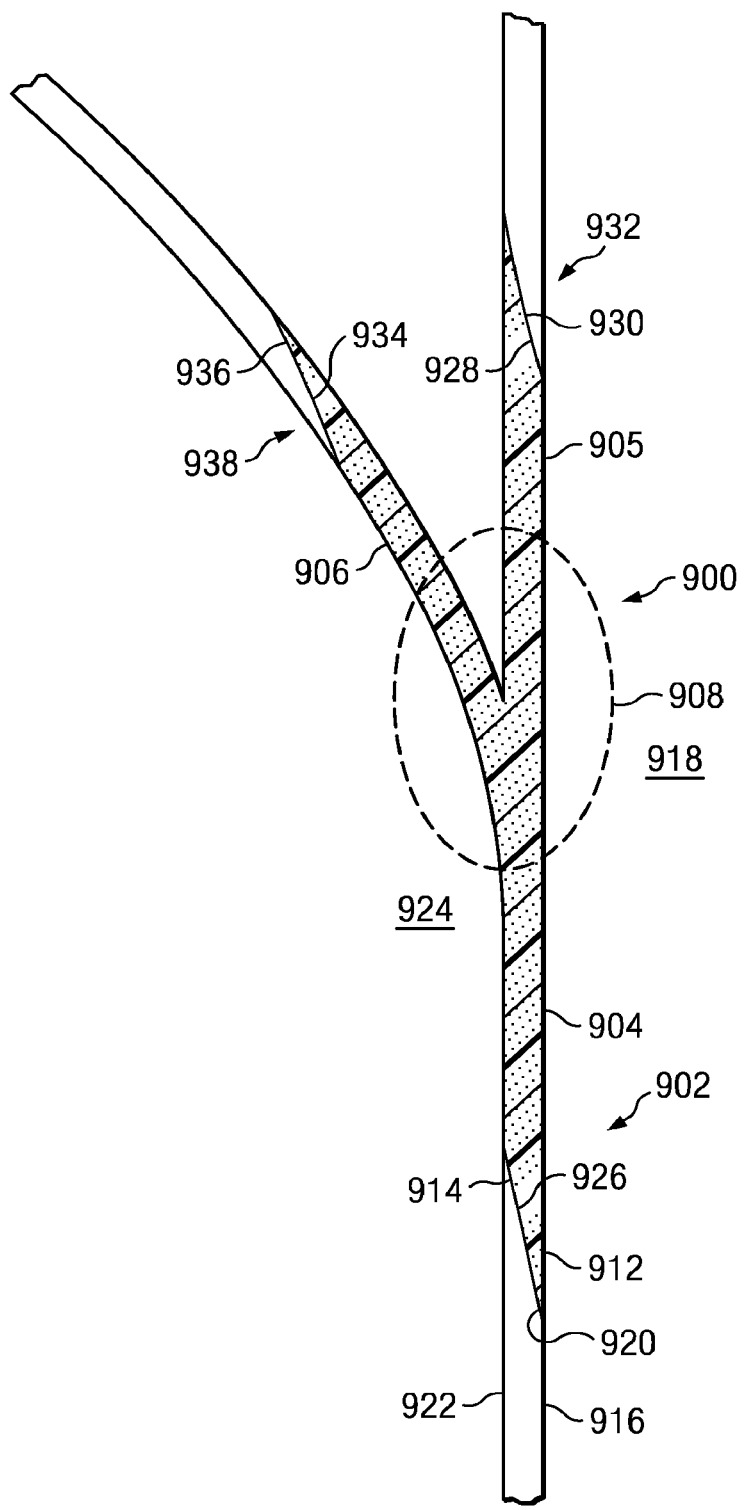
FIG. 9 is an illustration of a composite insert used to form a portion of a first structure and a second structure at a Y-joint in accordance with an advantageous embodiment.

With reference now to FIG. 9, an illustration of a composite insert used to form a portion of a first structure and a second structure at a Y-joint is depicted in accordance with an advantageous embodiment. In this illustrative example, composite insert 900 may be an example of one implementation for composite insert 312 in FIG. 3.

As depicted in this example, composite insert 900 may comprise structure 902 having first portion 904, second portion 905, and third portion 906 all extending from junction 908. In this example, first end 912 of first portion 904 may be bonded to first edge 914 of wall 916 of first structure 918 and first edge 920 of wall 922 of second structure 924. First end 912 bonded to first edge 914 of wall 916 and first edge 920 of wall 922 may form scarf joint 926.

Further, second end 928 of second portion 905 may be bonded to second edge 930 of wall 916 of first structure 918. Second end 928 bonded to second edge 930 of wall 916 may form scarf joint 932. Third end 934 of third portion 906 may be bonded to second edge 936 of wall 922 of second structure 924. Third end 934 bonded to second edge 936 of wall 922 may form scarf joint 938.

With reference now to FIG. 10, an illustration of a flowchart of a process for forming a Y-joint is depicted in accordance with an advantageous embodiment. The process illustrated in FIG. 10 may be used to create Y-joint 310 between first structure 302 and second structure 304 in FIG. 3.

The process may begin by placing composite insert 312 into joint region 309 for first structure 302 and second structure 304 (operation 1000). Composite insert 312 may comprise structure 314 and resin 316 impregnated in structure 314. In other words, structure 314 may be preform 317 prior to resin 316 being impregnated into structure 314 to form composite insert 312. Preform 317 with resin 316 may be cured in operation 1000.

The process may then lay up and/or position second structure 304 relative to first structure 302 (operation 1002). Thereafter, composite insert 312 may be bonded to first structure 302 and second structure 304 (operation 1004), with the process terminating thereafter. As discussed above, this bonding may be performed using various mechanisms. These mechanisms may include, for example, without limitation, co-curing, curing, adhesive bonding, and/or other suitable bonding techniques.

With reference now to FIG. 11, an illustration of a flowchart of a process for creating a Y-joint for a tank is depicted in accordance with an advantageous embodiment. The process illustrated in FIG. 11 may be a more-detailed example of one implementation for the process illustrated in FIG. 10. The process illustrated in FIG. 11 may be used to create a Y-joint between a composite cryogenic tank and a cryogenic skirt. As one illustrative example, this process may be used to create Y-joint 520 between tank 504 and forward skirt 512 in FIGS. 5-6.

The process may begin by laying up dome 506 and wall 510 of tank 504 (operation 1100). Thereafter, composite insert 606 may be placed into a joint region for tank 504 and forward skirt 512 (operation 1102). In operation 1102, composite insert 606 may be placed into the joint region and positioned with an adhesive film.

Next, forward skirt 512 may be laid up (operation 1104). Forward skirt 512 may be laid up over the area where dome 506 and wall 510 may be located along with composite insert 606. The components may then be cured (operation 1106), with the process terminating thereafter.

In operation 1106, the curing may be performed using heat, pressure, or a combination of the two. This curing operation may be performed using an autoclave or some other suitable oven. In other advantageous embodiments, the components may be cured using an electron beam.

The result of the curing operation in operation 1106 may be Y-joint 520 in FIG. 5. This joint may have increased load capabilities as compared to currently available Y-joints.

With reference now to FIG. 12, an illustration of a flowchart of a process for creating a composite insert is depicted in accordance with an advantageous embodiment. The process illustrated in FIG. 12 may be used to create a composite insert for use in the different operations illustrated in FIGS. 10 and 11. For example, without limitation, the process illustrated in FIG. 12 may be used to create composite insert 312 in FIG. 3 and/or composite insert 606 in FIGS. 6-8.

The process may begin by forming preform 317 (operation 1200). In these illustrative examples, preform 317 may have first portion 320, second portion 321, and third portion 322 all extending from junction 324. In these examples, preform 317 may have Y-shape 326. Preform 317 may be formed by creating fabric 364 from fibers 318 in the desired form. In these illustrative examples, preform 317 may be formed by, for example, without limitation, braiding fibers 318, weaving fibers 318, stacking woven materials, performing z-pinning, or performing some other suitable type of process using fibers 318.

Next, resin 316 may be infused into preform 317 (operation 1202). In this illustrative example, infusing resin 316 into preform 317 may be one example of impregnating resin 316 into preform 317 to create composite insert 312.

In these illustrative examples, the infusion in operation 1202 may be performed by placing a powder onto preform 317 and working the powder into preform 317. For example, without limitation, the infusion in operation 1202 may involve vibrating the preform and applying heat and pressure to perform the infusion into composite insert 312. The heat and pressure applied in operation 1202 may be performed using an autoclave, an oven, a device for applying localized heat and pressure, or some other suitable mechanism.

The infusion of resin 316 into preform 317 in operation 1202 may form composite insert 312. The heat and/or pressure may cure composite insert 312. In other illustrative examples, resin 316 may take another form other than a powder. For example, without limitation, resin 316 may be a liquid, a paste, a solid, or some other suitable type of compound.

The process may then shape composite insert 312 (operation 1204). In operation 1204, composite insert 312 may be machined, cut, or shaped using some other suitable process to form the desired dimensions for use in Y-joint 310. The process may etch the different surfaces of composite insert 312 (operation 1206). The etching may be performed to allow an adhesive film to be attached to the surface of the composite insert.

The process may then attach an adhesive film to the different surfaces of composite insert 312 (operation 1208), with the process terminating thereafter. The adhesive film may allow composite insert 312 to be attached or cured to, for example, without limitation, the skirt and dome of a tank and/or other structures during a curing process.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, without limitation, other operations may be included, such as preparation for bonding, shimming, caulplating, and other suitable operations. Additionally, some of the different operations may be performed concurrently or in different orders, depending on the particular implementation.

Thus, the advantageous embodiments may provide a method and apparatus for increasing the strength of a joint between structures. The different advantageous embodiments may include a composite insert in which the composite insert comprises a preform and a resin. The preform may comprise fibers in which the preform may have a first portion, a second portion, and a third portion all extending from a junction. The first portion, the second portion, and the third portion may form a Y-shape for the preform. The resin may be impregnated into the preform to create the composite insert. The composite insert may be used to form a Y-joint.

With the different advantageous embodiments, increased strength in Y-joints may be provided for different structures as compared to currently used Y-joints. Additionally, when used with composite materials, the different advantageous embodiments may be integrated as part of those structures. Further, the different advantageous embodiments may be used with objects other than spacecraft as shown in these examples. For example, without limitation, the composite insert may be used in a joint for structures in a submarine, an aircraft, a building, a dam, a manufacturing facility, a power plant, a tank, or some other suitable object.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a Y-joint between a cryogenic skirt having an interior and a tank, the method comprising:
    forming a composite insert comprising a first portion, a second portion, and a third portion, all extending from a junction in which the first portion has a first surface and a second surface, the second portion has a first surface and a second surface, and the third portion has a first surface and a second surface, wherein the third portion diverges from the first portion and the second portion such that the composite insert has a Y-shaped portion;
    placing the composite insert into a joint region in contact with the tank such that a surface of the tank contacts the second surface of the third portion of the composite insert and the second surface of the first portion of the composite insert;
    positioning an inboard skin of the cryogenic skirt such that the inboard skin of the cryogenic skirt contacts the first surface of the second portion of the composite insert and the first surface of the first portion of the composite insert, wherein the cryogenic skirt has the inboard skin, an outboard skin, and a core between the inboard skin and the outboard skin, wherein the inboard skin is a continuous inner layer and the outboard skin is a continuous outer layer; and
    bonding together the composite, the cryogenic skirt, and the tank, such that the tank is bonded within the interior of the cryogenic skirt.

2. The method of claim 1, wherein the step of bonding the composite insert to the cryogenic skirt and the tank comprises:
    curing the cryogenic skirt and the tank with the composite insert in place.

3. The method of claim 1, wherein forming includes forming the composite insert such that the first surface of the first portion is co-planar with the first surface of the second portion.

4. The method of claim 1 further comprising:
curing the composite insert prior to placing the composite insert in contact with the cryogenic skirt.

5. The method of claim 4, wherein bonding comprises bonding the composite insert to the cryogenic skirt and the tank using an adhesive.

6. The method of claim 4, wherein bonding comprises co-curing the composite insert along with the cryogenic skirt and the tank.

7. The method of claim 1, wherein the tank comprises a dome and a wall that together form the surface of the tank.

8. The method of claim 7, wherein positioning the tank further comprises positioning the tank such that an outer surface of the tank contacts the inboard skin at a first side of the joint region and the dome diverges from the inboard skin at a second side of the joint region, opposing the first side of the joint region; and wherein bonding the composite insert to the cryogenic skirt and the tank forms the Y-joint, directly attached to the inboard skin, the dome, and the wall.

9. The method of claim 7, wherein positioning the tank further comprises positioning the tank such that an outer surface of the tank contacts the inboard skin at a first side of the joint region and the dome diverges from the inboard skin at a second side of the joint region, opposing the first side of the joint region; and wherein bonding the composite insert to the cryogenic skirt and the tank forms the Y-joint directly attached to the inboard skin, the dome, and the wall, wherein the first portion is attached to both the inboard skin and the tank, the second portion is attached to the inboard skin, and the third portion is attached to the dome.

10. The method of claim 1, wherein the cryogenic skirt comprises an inboard skin of a rocket and the tank is a fuel tank.

11. The method of claim 1, wherein forming includes forming the composite insert from a woven fabric of fibers.

12. The method of claim 1, wherein forming includes forming the composite insert from a non-woven fabric of fibers.

13. The method of claim 1, wherein positioning the tank comprises laying up the tank such that the surface of the tank contacts the second surface of the third portion and the second surface of the first portion.

14. The method of claim 1 wherein bonding the composite insert to the cryogenic skirt and tank comprises bonding the composite insert to the cryogenic skirt such that the inboard skin of the cryogenic skirt is bonded to the first surface of the second portion of the composite insert and the first surface of the first portion of the composite insert.

15. The method of claim 1, wherein the core is a low-density structure element.

16. The method of claim 1, wherein the inboard skin and the outboard skin are composite components.

17. The method of claim 1, wherein the step of bonding together the composite insert, the cryogenic skirt, and the tank comprises co-bonding the composite insert to the inboard skin of the cryogenic skirt and to the tank.

18. The method of claim 1, wherein the step of bonding together the composite insert, the cryogenic skirt, and the tank comprises secondarily bonding together the composite insert, the cryogenic skirt, and the tank.

19. The method of claim 1, wherein the cryogenic skirt and the tank are components of a launch vehicle, a spacecraft, or an aircraft, and wherein the tank is configured to hold a liquid propellant.

20. A method of forming a Y-joint between a cryogenic skirt and a tank, the method comprising:
forming a composite insert comprising a first portion, a second portion, and a third portion, all extending from a junction in which the first portion has a first surface and a second surface, the second portion has a first surface and a second surface, and the third portion has a first surface and a second surface, wherein the third portion diverges from the first portion and the second portion such that the composite insert has a Y-shaped portion;

bonding an inboard skin of the cryogenic skirt to the composite insert such that the inboard skin of the cryogenic skirt is bonded to the first surface of the second portion of the composite insert and the first surface of the first portion of the composite insert, wherein the cryogenic skirt has the inboard skin, an outboard skin, and a core between the inboard skin and the outboard skin, wherein the inboard skin is a continuous inner layer, wherein the outboard skin is a continuous outer layer;

bonding the tank to the composite insert such that a dome of the tank is bonded to the third portion of the composite insert and a wall of the tank is bonded to the second surface of the first portion; and bonding the tank directly to the inboard skin.

* * * * *